United States Patent
Foss et al.

(10) Patent No.: US 7,792,897 B2
(45) Date of Patent: Sep. 7, 2010

(54) DISTRIBUTED TRANSACTION PROCESSING SYSTEM

(75) Inventors: Lou Foss, Frederick, MD (US); Israel Alan Halachmi, Gaithersburg, MD (US)

(73) Assignee: International Business Machines Corporation, Armonk, NY (US)

( * ) Notice: Subject to any disclaimer, the term of this patent is extended or adjusted under 35 U.S.C. 154(b) by 288 days.

(21) Appl. No.: 12/131,514

(22) Filed: Jun. 2, 2008

(65) Prior Publication Data

US 2009/0300622 A1 Dec. 3, 2009

(51) Int. Cl.
G06F 15/16 (2006.01)

(52) U.S. Cl. .................... 709/201; 709/203; 718/101

(58) Field of Classification Search .............. 709/201
See application file for complete search history.

(56) References Cited

U.S. PATENT DOCUMENTS

| | | | | |
|---|---|---|---|---|
| 5,799,156 | A * | 8/1998 | Hogan et al. | 709/237 |
| 6,549,934 | B1 * | 4/2003 | Peterson et al. | 709/203 |
| 6,957,251 | B2 * | 10/2005 | Wisner et al. | 709/220 |
| 2002/0129294 | A1 * | 9/2002 | Pedone et al. | 714/4 |
| 2002/0156918 | A1 | 10/2002 | Valdevit et al. | |
| 2003/0126200 | A1 | 7/2003 | Wolff | |
| 2004/0030745 | A1 | 2/2004 | Boucher et al. | |
| 2006/0230305 | A1 * | 10/2006 | Smith et al. | 714/4 |
| 2007/0011226 | A1 * | 1/2007 | Hinni et al. | 709/203 |
| 2007/0124342 | A1 * | 5/2007 | Yamamoto et al. | 707/202 |
| 2007/0245352 | A1 * | 10/2007 | Ma | 718/105 |
| 2008/0126853 | A1 * | 5/2008 | Callaway et al. | 714/13 |

FOREIGN PATENT DOCUMENTS

EP 1180886 A1 * 2/2002

OTHER PUBLICATIONS

Oracle Corporation. "Hot Standby for Disaster Tolerant Systems." Web page, Oracle.com. Archived by the Internet Archive on Sep. 6, 2006: <http://web.archive.org/web/20060906225341/http://www.oracle.com/technology/products/rdb/htdocs/dbms/hotstandby.html>. pp. 1-3.*
Hewlett-Packard Company. "Configuration alternatives to optimize disaster readiness and recovery." Jul. 2002. pp. 1-6.*
Zuo et al. "Combining Replication with Transaction Processing for Enhanced Reliability in J2EE," ISSRE, pp. 279-288, 17th International Symposium on Software Reliability Engineering (ISSRE'06), 2006.*

* cited by examiner

Primary Examiner—Philip C Lee
Assistant Examiner—Christopher Biagini
(74) Attorney, Agent, or Firm—Douglas Lashmit; Hoffman Warnick LLC

(57) ABSTRACT

An infrastructure and method for processing a transaction using a plurality of target systems. The method includes: generating a request from a source system, wherein the request includes an initial identifier and a counter value; submitting the request to at least two target systems; processing the request at a first target system and ignoring the request at a second target system based on the initial identifier; submitting a resubmitted request to the at least two target systems if a timely response is not received by the source system, wherein the resubmitted request includes an incremented counter value; and processing the resubmitted request by only one of the first and second target systems based on the incremented counter value.

20 Claims, 2 Drawing Sheets

DISTRIBUTED TRANSACTION PROCESSING SYSTEM

FIELD OF THE INVENTION

The invention relates generally to distributive processing, and more particularly relates to a system and method for distributing transaction processing among a plurality of deterministic systems.

BACKGROUND OF THE INVENTION

Information technology (IT) industry businesses need the ability to distribute transaction processing across multiple sites and have that processing handled in an efficient manner, effectively using the computing resources available, and recovering from transaction, transmission, or response failures when they occur. For example, in processing credit card transactions, a determination must be made whether the purchaser has sufficient credit before the transaction can proceed. Given the need for speed and accuracy in such an environment, multiple distributed systems may be required to handle bandwidth and other error conditions.

One particular solution may be to provide redundant transaction processing systems in which each processing system is "deterministic" in that each will process data in the same manner to provide the same result. Unfortunately, this strategy may have significant limitations due to increased processing, storage, and bandwidth requirements. Current techniques fail to overcome all of the penalties associated with redundant, deterministic transaction processing systems. Accordingly, a need exists for a distributed processing system that can achieve a highly-available, transactional distributed processing model without incurring all of the penalties associated with such operations.

SUMMARY OF THE INVENTION

The present invention addresses the above-mentioned problems, as well as others, by providing a method and infrastructure that includes a plurality of target systems for processing transactions.

In a first aspect, a method for processing a transaction is provided, comprising: generating a request from a source system, wherein the request includes an initial identifier and a counter value; submitting the request to at least two target systems; processing the request at a first target system and ignoring the request at a second target system based on the initial identifier; submitting a resubmitted request to the at least two target systems if a timely response is not received by the source system, wherein the resubmitted request includes an incremented counter value; and processing the resubmitted request by only one of the first and second target systems based on the incremented counter value.

In a second aspect, an infrastructure for processing a transaction is provided, comprising: a source system configured for generating a request, wherein the request includes an initial identifier and a counter value; at least two target systems configured to receive the request, wherein the request is processed at a first target system and ignored at a second target system based on the initial identifier; wherein the source system is configured to generate a resubmitted request to the at least two target systems if a timely response is not received by the source system, wherein the resubmitted request includes an incremented counter value; and wherein the resubmitted request is processed by only one of the first and second target systems based on the incremented counter value.

In a third aspect, a method for processing a transaction is provided, comprising: providing a pair of target systems, each having a deterministic processing system that will generate a common response for a common request; submitting a request to the pair of target systems, wherein the request includes an initial identifier and a counter value; processing the request at a first target system and ignoring the request at a second target system based on the initial identifier; submitting a resubmitted request to the pair of target systems if a timely response is not received, wherein the resubmitted request includes an incremented counter value; and processing the resubmitted request by only one of pair of target systems based on the incremented counter value.

In a fourth aspect, a method for deploying a system for submitting transaction requests to a plurality of target systems is provided, comprising: providing a computer infrastructure being operable to: submit a request that includes an initial identifier and a counter value; resubmit the request if a timely response is not received, wherein a resubmitted request includes an incremented counter value; and ignore redundant responses.

BRIEF DESCRIPTION OF THE DRAWINGS

These and other features of this invention will be more readily understood from the following detailed description of the various aspects of the invention taken in conjunction with the accompanying drawings in which.

DETAILED DESCRIPTION OF THE INVENTION

Figure 1:
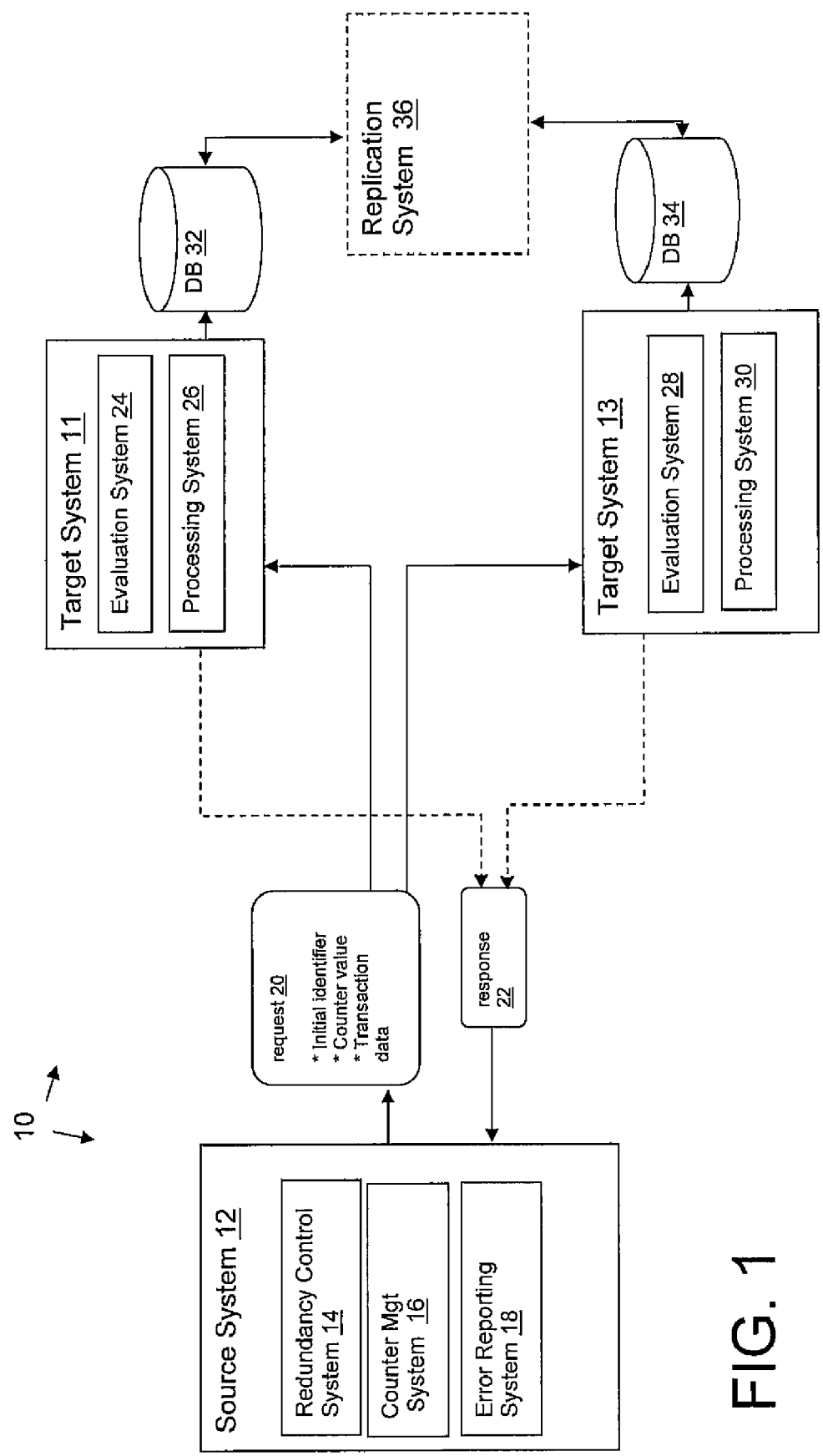
FIG. 1 depicts a distributed transaction processing infrastructure in accordance with an embodiment of the present invention.

Referring now to drawings, FIG. 1 depicts a distributed transaction processing infrastructure 10 that includes a source system 12 and pair of target systems 11 and 13. Source system 12 represents any type of information technology solution capable of submitting requests via a network, and target systems 11 and 13 represent any type of information technology solution capable of receiving, processing and responding to requests via the network. As explained in further detail below, whenever source system 12 requires a response 22, a request 20 is submitted to both target system 11 and target system 13, referred to herein as diversity processing. Request 20 may comprise any type of data packet in which a request for information is sought, e.g., a request for credit card authorization, a request for security clearance, a request for an account balance, a request for a score, etc. Response 22 may likewise include any type of data packet that is responsive to the request 20, e.g., an authorization, a clearance, an account balance, a score, a binary value, etc.

Target systems 11 and 13 each include a deterministic processing system 26 and 30, respectively. Accordingly, each target system 11, 13 will always generate an identical or common response 22 for an identical or common request 20. In addition, each target system 11, 13 includes an evaluation system 24, 28 for determining which target system 11, 13 should process the request 20. Note that while the embodiment described herein illustrates an infrastructure involving two target systems 11, 13, it is understood that the invention could be implemented with two or more target systems.

Target systems 11, 13 provide redundancy in the event one of the target systems 11, 13 fails to generate a timely response 22 to a request 20. As noted, anytime a request 20 is generated, it is sent to both target systems 11, 13. Although both target systems 11 and 13 receive each request 20, a given request 20 is only processed by one of the target systems and ignored by the other. If a response 22 is not received for a request 20, the request 20 is resubmitted again to both target systems 11, 13. Initial requests 20 from source system 12 are handled by a predetermined one of the target systems 11, 13. For instance, target system 11 may initially handle all requests from source systems east of the Mississippi, while target system 13 may handle all requests from source systems west of the Mississippi. Assuming source system 12 was in New York, any requests 20 it generated would initially be handled by target system 11, and ignored by target system 13. Accordingly, each request includes an "initial identifier" that determines which target system 11, 13 should handle the initial request. The initial identifier may for instance comprise the identity of the source system, the identity of a target system, a value, etc.

Also included in each request is a counter value that dictates which target system should handle "resubmitted" requests (i.e., in the case where a previous request failed). In one illustrative embodiment, the request 20 includes a counter value initially set to 0, indicating that the initial identifier should be used to determine which target system should process the request. If a request 20 needs to be resubmitted, the counter is incremented to 1, then 2, and so on. Each target system 11, 13 could then examine the counter value to determine if it should process the resubmitted request or ignore it. Thus, for instance, target system 11 could handle requests having an odd counter value, and target system 13 could handle requests having an even counter value. Thus, in addition to the transaction data contained in the request 20, a counter value and initial identifier (e.g., name of the source system) are also included.

Each target system 11, 13 includes an evaluation system 24, 28 for evaluating whether the target system should process the request, and a processing system 26, 30 for processing requests that should be processed by the target system. Any algorithm or other facility may be used to determine if a request belongs to the target system. For example, if the counter is set to 0, then each evaluation system 24, 28 may look at the identify of the source system 12 (i.e., the initial identifier) to determine if it should process the request. If the counter is greater than 0, then a determination is made based on the value of the counter. This determination may be implemented in a simple round robin or alternating fashion, or a more complex implementation may be used (e.g., load control may be implemented by specifying which counter values are to be handled by which target system).

Each target system 11, 13 also includes an associated database (DB) 32, 34 for storing transactions (i.e., requests and responses). A replication system 36 is utilized to replicate transactions between the databases 32, 34. Although shown here as a third party system, replication system 36 could be implemented in part or whole on one or more of the target systems 11, 13.

Source system 12 includes: a redundancy control system 14 for handling the case in which multiple responses 22 are returned (e.g., where the initial request was handled too late); a counter management system 16 for incrementing the counter when a timely response is not received; and an error reporting system 18 which, e.g., reports when a given target system has a large number of failures.

Figure 2:
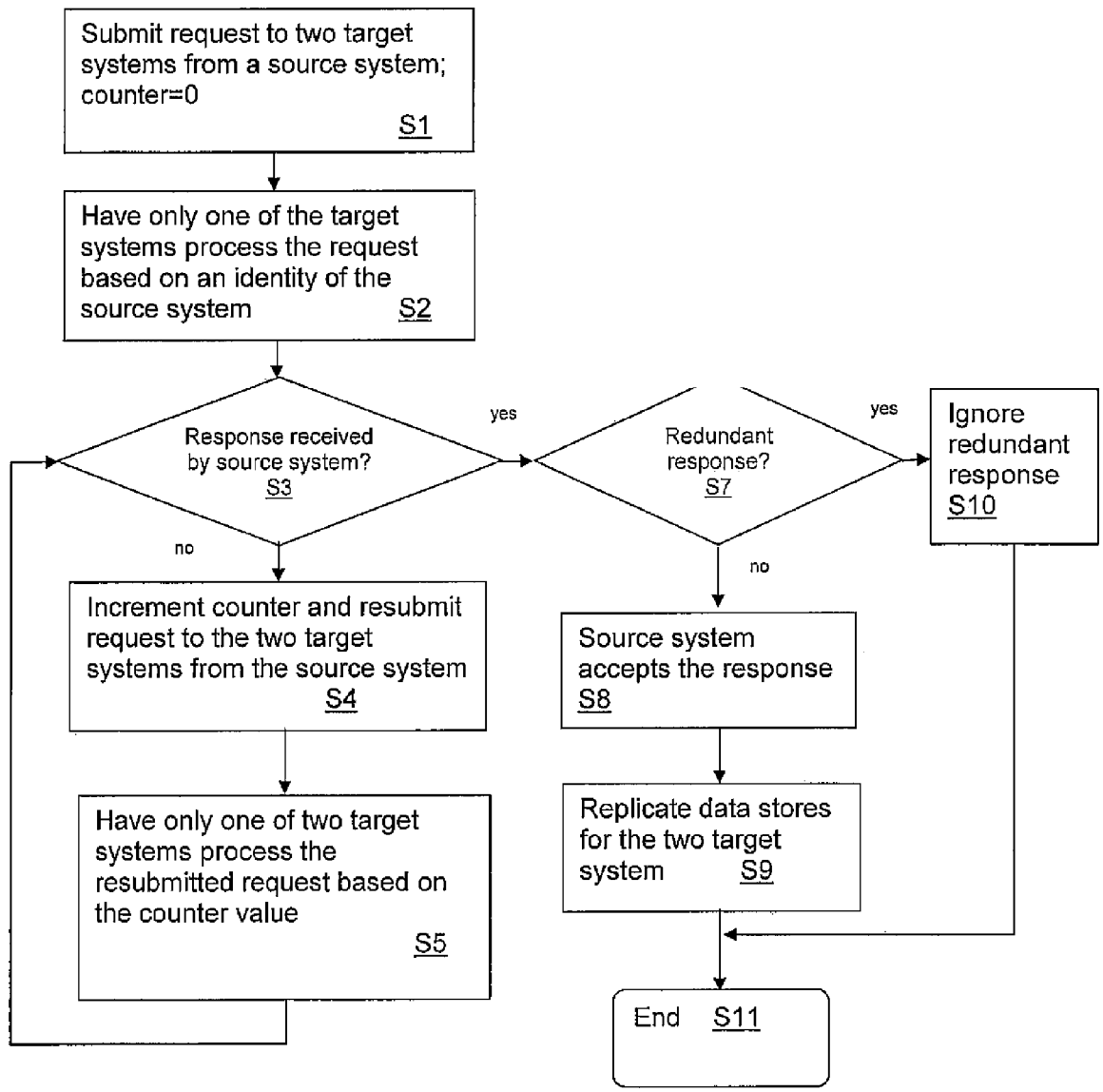
FIG. 2 depicts a flow diagram depicting a distributed processing methodology in accordance with an embodiment of the present invention.

FIG. 2 depicts a flow diagram describing an illustrative diversity processing method for implementing the invention. At S1, a source system submits a request to the two target systems. The request includes a counter value set to 0. Next, at S2, only one of the two target systems processes the request, e.g., based on the initial identifier (e.g., identify of the source system).

Next, at S3, a determination is made whether the source system received a response to the submitted request. If no (i.e., a failure occurred), then the counter is incremented and the request is resubmitted to the two target systems at S4. At S5, only one of the two target systems processes the resubmitted request based on the counter value. In one embodiment, the target system that did not process the immediately preceding request processes the resubmitted request. Control then loops back to S3 where a determination is again made whether the source system received a response to the resubmitted request. After some number of failures (e.g., 3-4), the process may simply end in a failure condition indicating that the request could not be processed.

If at S3 a response is received by the source system, a check is made at S7 to determine if the response is a redundant response. This may occur, for instance, in the case where the first target system was late in returning a response, which caused the source system to resubmit the request, which then was processed by the second target system. If the response was a redundant response, then the response is ignored at S10 and the process ends at S11. If the response was not a redundant response, then the source accepts the response at S8, the databases for the target system are replicated at S9, and the process ends at S11.

Benefits of this approach include:

1) Autonomic failure recovery prior to automated or manual intervention. That is, if a target system were to completely fail, transactions would automatically migrate to another target system.

2) Granular load control based on source with failure recovery. In the case that a first target system was to lose 50% of its processing capacity, an operator could dynamically configure the target ownership to reflect a 25% first-response allocation to the first target system and a 75% first-response allocation to the second target system.

3) When used in conjunction with a robust monitoring platform, thresholds may be setup to identify malfunctioning source and/or target systems.

4) Segmented operations. In the case where the back-end database replication capability was disabled, or the communications paths between the two target systems was unavailable, the systems would still be able to operate appropriately. Diversity processing allows for the inference of the state of other target systems. When the link between the target systems is reestablished, transactional database replication would ensure that the distributed versions of the information converged into synchronization.

Illustrative Applications Involving Credit Card Scoring

Many source systems across the country are retail outlets that accept credit card applications, and can return a result back to the subscriber if their credit score is high enough to be issued an immediate card. Retail outlets are organized by location—retail centers east of the Mississippi are processed by processing center "A", while retail centers west of the Mississippi are processed by processing center "B."

Typical Operation 1

Processing centers "A" and "B" are identical in processing results, but may not be identical in processing capacity. A retail center in Denver sends transactions to both processing centers "A" and "B", with the initial identifier (i.e., source system) set to Denver and the counter value set to 0. Processing center "A" receives the transaction, views the source system and counter value, and determines that it should not process the data.

Processing Center "B" receives the transaction, views the source system and counter, and determines that it should take action on this transaction. It processes the data, returning the result back to Denver. Processing center "B" replicates its database with "A" ensuring that "A" also has a copy of the results.

Typical Operation 2

A retail center in Philadelphia, Pa. sends a transaction to both processing centers, with the source system set to Philly, and counter value set to 0. Processing center "A" receives the transaction, views the source system and counter value, and determines that it should take action on this transaction. It processes the data, returning the result back to Philly.

Processing center "B" receives the transaction, views the source system and counter value, and determines that it should not process the data. Processing center "A" replicates its database with "B" ensuring that "B" also has a copy of the results.

Failure Mode

A retail center in Denver sends a transaction to both data centers "A" and "B", with the source system set to Denver and counter value set to 0. Processing Center "A" receives the transaction, views the source system and counter value and determines that it should not process the data. Processing center "B" never receives the transaction because of an error in transmission.

The retail center in Denver times out and retransmits the transaction to both data centers "A" and "B" with the source system set to Denver and counter value set to 1. Processing center "A" receives the transaction, views the source system and counter value, and determines that there must be a problem with "B;" so, "A" processes the result, and sends the result back to Denver. Processing Center "A" replicates its database with "B" ensuring that "B" also has a copy of the results.

Referring again to FIG. 1, it is understood that source system 12, target systems 11, 13 and replications system 36 may be implemented by any type of computing/IT devices, and may be implemented as part of a client and/or a server. Such computing/IT devices may include a processor, input/output (I/O), memory, and a bus. The processor may comprise a single processing unit, or be distributed across one or more processing units in one or more locations, e.g., on a client and server. Memory may comprise any known type of data storage and/or transmission media, including magnetic media, optical media, random access memory (RAM), read-only memory (ROM), a data cache, a data object, etc. Moreover, memory may reside at a single physical location, comprising one or more types of data storage, or be distributed across a plurality of physical systems in various forms.

I/O may comprise any system for exchanging information to/from an external resource. External devices/resources may comprise any known type of external device, including a monitor/display, speakers, storage, another computer system, a hand-held device, keyboard, mouse, voice recognition system, speech output system, printer, facsimile, pager, etc. The bus provides a communication link between each of the components in the computing devices and likewise may comprise any known type of transmission link, including electrical, optical, wireless, etc. Additional components, such as cache memory, communication systems, system software, etc., may be incorporated into the computing devices.

Access to the various systems may be provided over a network such as the Internet, a local area network (LAN), a wide area network (WAN), a virtual private network (VPN), etc. Communication could occur via a direct hardwired connection (e.g., serial port), or via an addressable connection that may utilize any combination of wireline and/or wireless transmission methods. Moreover, conventional network connectivity, such as Token Ring, Ethernet, WiFi or other conventional communications standards could be used. Still yet, connectivity could be provided by conventional TCP/IP sockets-based protocol. In this instance, an Internet service provider could be used to establish interconnectivity. Further, as indicated above, communication could occur in a client-server or server-server environment.

It should be appreciated that the teachings of the present invention could be offered as a business method on a subscription or fee basis. For example, the necessary systems on the source and target systems could be created, maintained and/or deployed by a service provider that offers the functions described herein for customers. That is, a service provider could offer to provide distributive diversity processing as described above.

It is understood that the systems, functions, mechanisms, methods, engines and modules described herein can be implemented in hardware, software, or a combination of hardware and software. They may be implemented by any type of computer system or other apparatus adapted for carrying out the methods described herein. A typical combination of hardware and software could be a general-purpose computer system with a computer program that, when loaded and executed, controls the computer system such that it carries out the methods described herein. Alternatively, a specific use computer, containing specialized hardware for carrying out one or more of the functional tasks of the invention could be utilized. In a further embodiment, part or all of the invention could be implemented in a distributed manner, e.g., over a network such as the Internet.

The present invention can also be embedded in a computer program product, which comprises all the features enabling the implementation of the methods and functions described herein, and which—when loaded in a computer system—is able to carry out these methods and functions. Terms such as computer program, software program, program, program product, software, etc., in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

The foregoing description of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of this invention as defined by the accompanying claims.

The invention claimed is:

1. A method for processing a transaction, comprising:
generating a request from a source system, wherein the request includes an initial identifier and a counter value;
submitting the request to at least two target systems;
processing the request at a first target system and ignoring the request at a second target system based on the initial identifier;

submitting a resubmitted request to the at least two target systems if a timely response is not received by the source system, wherein the resubmitted request includes an incremented counter value; and processing the resubmitted request by only one of the first and second target systems based on the incremented counter value.

2. The method of claim 1, wherein the initial identifier includes an identity of the source system.

3. The method of claim 1, wherein the initial identifier includes an initial counter value.

4. The method of claim 1, further comprising:
storing the request and response in a first database associated with the target system that processed the request; and
replicating the first database with a second database associated the target system that did not process the request.

5. The method of claim 1, further comprising ignoring redundant responses at the source system.

6. The method of claim 1, further comprising reporting errors from the source system regarding failures occurring at the at least two target systems.

7. The method of claim 1, wherein both the first target system and the second target system include processing systems that are deterministic and will generate a common response for a common request.

8. An system for processing a transaction, comprising:
a source system configured for generating a request, wherein the request includes an initial identifier and a counter value;
at least two target systems configured to receive the request, wherein the request is processed at a first target system and ignored at a second target system based on the initial identifier;
wherein the source system is configured to generate a resubmitted request to the at least two target systems if a timely response is not received by the source system, wherein the resubmitted request includes an incremented counter value; and
wherein the resubmitted request is processed by only one of the first and second target systems based on the incremented counter value wherein at least one of the source system and the at least two target systems comprises hardware.

9. The system of claim 8, wherein the initial identifier includes an identity of the source system.

10. The system of claim 8, wherein the initial identifier includes an initial counter value.

11. The system of claim 8, further comprising:
a first database for storing the request and response associated with the target system that processed the request; and
a replication system for replicating the first database with a second database associated the target system that did not process the request.

12. The system of claim 8, wherein the source system includes a redundancy control system for ignoring redundant responses.

13. The system of claim 8, wherein the source system includes an error reporting system for reporting failures occurring at the target systems.

14. The system of claim 8, wherein the both the first target system and the second target system include processing systems that are deterministic and will generate a common response for a common request.

15. A method for processing a transaction, comprising:
providing a pair of target systems, each having a deterministic processing system that will generate a common response for a common request;
submitting a request to the pair of target systems, wherein the request includes an initial identifier and a counter value;
processing the request at a first target system and ignoring the request at a second target system based on the initial identifier;
submitting a resubmitted request to the pair of target systems if a timely response is not received, wherein the resubmitted request includes an incremented counter value; and
processing the resubmitted request by only one of pair of target systems based on the incremented counter value.

16. The method of claim 15, wherein the request is resubmitted a second time to the pair of target systems with a further incremented counter if a response is not received in a timely manner.

17. The method of claim 16, wherein the first and second target system alternate attempting to process the request in a round-robin fashion.

18. The method of claim 15, wherein the initial identifier includes an identity of the source system.

19. The method of claim 15, wherein the first and second target systems include databases that are replicated after a transaction is processed by one of the target systems.

20. The method of claim 15, further comprising ignoring redundant responses.

* * * * *